Oct. 23, 1951  G. E. A. FALK  2,572,460

METHOD OF FOLDING MAPS AND THE LIKE

Filed Feb. 10, 1949

INVENTOR.
Gerhard Ernst Albrecht Falk
BY

"Patented Oct. 23, 1951"

UNITED STATES PATENT OFFICE 2,572,460

METHOD OF FOLDING MAPS AND THE LIKE

Gerhard Ernst Albrecht Falk,
Hamburg, Germany

Application February 10, 1949, Serial No. 75,655
In Great Britain August 27, 1948

3 Claims. (Cl. 281—1)

This invention relates to a method of folding maps and the like, and has for its purpose to bring such maps into a handy shape. As a general rule such maps are of comparatively large size, so that as great an area as possible of a district or an inhabited place can be shown on a sufficiently large scale. Maps of such large size are very unhandy and difficult to read when they are spread out, and either other people or the map reader are inconvenienced. In gusts of wind the map flaps about or even tears, to mention only a few disadvantages.

The invention aims at removing these drawbacks to which folded maps are subject. The first requirement is that a map of large size can be reduced, that is folded, to a size which is as small as possible. A second requirement is that the section of the map being read should be as large as possible; thirdly, the map should be able to be unfolded quickly and without trouble, and fourthly, the map, after being completely unfolded should be able to be replaced quickly and easily into its folds.

For a solution of this problem there is proposed: a method of folding of maps (of a country, town, or the like) into book like form, according to which the map is provided with folds in concertina fashion and with transverse pleats which can be turned over, and are situated at intervals from each other, and are cut down to the plane of the map.

The map (of country, town, or the like) which is folded according to the method described above, may be mounted and fastened by one of its corners in a protecting cover; the transverse pleats can be turned over either upwards and downwards or to the right and left.

The methods of the invention will now be explained referring to the accompanying drawing, in which.

Figure 1:
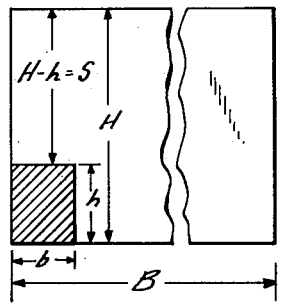
Figure 1 is a diagram showing a map which is to be reduced in size.
Figure 2:
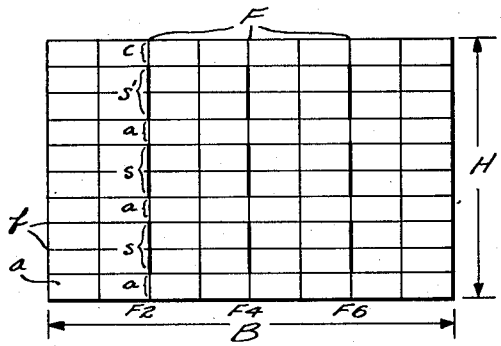
Figure 2 shows a diagram of the fold lines and cuts.

Referring to Figures 1 and 2 the ratio of reduction R is to be understood to mean the quotient obtained by dividing the total height H of the map in unfolded condition by the height $h$ of the map when folded in pleats, thus $$R = \frac{H}{h}$$

Then $H-h$ is the total length S of the cuts "$s$" by which the map must be cut and which is to be subdivided by bridges into separate cuts.

Hence the length of one separate cut $$s = \frac{S}{\text{Number of transverse pleats}}$$

The breadth $b$ of the map folded together like a concertina results from the quotient between the total breadth B in unfolded condition of the map and the number $n$ of the longitudinal folds, thus $$b = \frac{B}{n+1}$$

As shown in Fig. 2 a map is cut along the vertical foldlines F 2, 4 and 6 by three separate cuts, thus permitting the formation of three pleats. The uppermost $s'$ cut begins at the distance $c$ from the upper edge of the map. The distance $c$ should at least be equal to $$\frac{s}{2}$$

so that the upper transverse pleat does not extend beyond the edge of the map. Three separate cuts correspond to three bridges $a$, bounded by horizontal foldlines F, for in the sense of the invention the distance from the lower edge of the map to the lowest cut is also a bridge. The total length of the bridges is $h-c$, and thus the breadth of one bridge $$a = \frac{h-c}{\text{Number of transverse pleats}}$$

Rigidity of the map in folded condition is obtained by keeping "$a$" smaller or making it equal to $$\frac{s}{2}$$

which means, that one transverse pleat partially overlaps or at least extends as far as the next one.

This means that the lower transverse pleat $p$ partly overlaps the upper one, so that there is no weak spot between the pleats.

Preferably the ratio between the vertical extension of the transversal pleats and the width of a bridge is chosen the greater, the more bridge portions are provided, and this ratio between the vertical extension of the transversal pleats and the width of the bridges should be substantially the same as the ratio between the vertical extension of the map in unfolded and in folded position.

Figure 3:
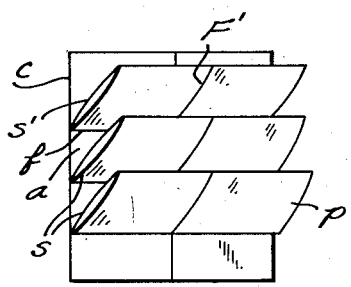
Figure 3 shows diagrammatically the map after being folded and placed in a protective cover.

In Fig. 3 the cuts $s$ are shown on the sides of the pleats $p$, which are folded along horizontal foldlines $f$. The map is completely closed by folding it about the vertical foldline F'.

After having chosen a scheme of folding the necessary separate cuts are made in the foldlines F provided for them and then the map is folded.

According to the invention the transverse pleats p formed in this way are all to be put down in one direction, either upwards, as shown in Figure 3, or downwards.

Figure 4:
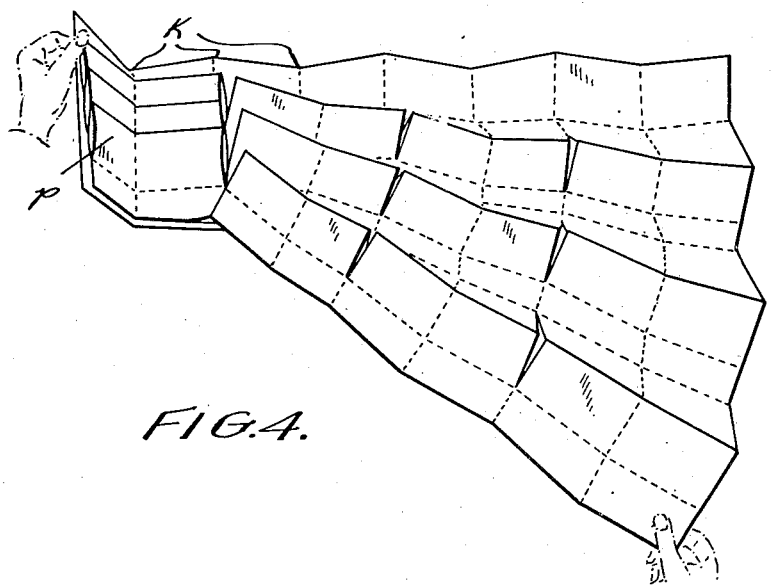
Figure 4 is a diagrammatic representation showing a map in the course of being completely unfolded.

Figure 4 shows diagrammatically, how a map folded into pleats p and accordion-type folds k according to the method is pulled out of the cover, i. e. unfolded, by the right-hand lower corner of the map in a downward direction.

The invention gives a simple rule for the most suitable measuring of the reduction of the map, of the number of transverse pleats and of the relation between the length of the separate cuts and the breadth of the bridges. Besides, the invention furnishes the possibility of reducing maps of any height to the size of a book, thus solving the underlying problem in the best possible way.

I claim:

1. A rectangular map subdivided by vertical and horizontal fold lines arranged parallel to the edges of said map into a plurality of rectangular map portions, said map portions forming simultaneously part of a series of vertical rows of map portions and of a series of horizontal rows of map portions; said vertical rows of map portions being of equal width in horizontal direction, and each third horizontal row of map portions being slightly narrower in vertical direction than each of the two interposed horizontal rows of map portions between said narrower rows of map portions; horizontal fold lines in said map extending along the edges of the pairs of interposed horizontal rows of map portions so as to permit folding of each of said pairs of interposed horizontal rows of map portions into an upwardly projecting pleat; a plurality of vertical rows of straight incisions in said map, the first and last incision in each row of incisions being spaced from the horizontal edge of said map, each of said incisions disposed in every second vertical fold line and extending vertically through one of said pairs of interposed horizontal rows of map portions thus subdividing each of the upwardly projecting pleats formed by the same into independent pleat portions having each the width of two vertical rows of map portions; and vertical fold lines in said map arranged along the edges of said vertical rows of map portions in such a way as to permit accordion-like folding of said map with the vertical fold lines containing said incisions forming the outwardly disposed ridges of said accordion-like folds, said incisions thus permitting folding of each two vertical rows containing said pleat portions relative to each other about said vertical fold lines and folding of said pleat portions independently of each other about the horizontal edges of each of said pleat portions.

2. A map according to claim 1 including the feature that the ratio between the vertical extension of said interposed horizontal rows of map portions and the vertical extension of said third horizontal row of map portions is chosen the greater the more horizontal rows of map portions are provided.

3. A map according to claim 1 including the feature that the ratio between the vertical extension of said pair of interposed horizontal rows of map portions and the vertical extension of each third horizontal row of map portions is substantially the same as the ratio between the vertical extension of the unfolded map and the vertical extension of the folded map.

GERHARD ERNST ALBRECHT FALK.

REFERENCES CITED

The following references are of record in the file of this patent:

FOREIGN PATENTS

| Number | Country | Date |
| --- | --- | --- |
| 691,389 | France | July 8, 1930 |
| 827,100 | France | Jan. 18, 1938 |